US012677761B1

(12) United States Patent     (10) Patent No.:   US 12,677,761 B1

Goodman et al.     (45) Date of Patent:     Jul. 14, 2026

(54) LANDSCAPING CONTAINMENT SYSTEM

(71) Applicant: Karogen LLC, Delray Beach, FL (US)

(72) Inventors: Kathy E. Goodman, Delray Beach, FL (US); Robert Sunstone, North Palm Beach, FL (US)

(73) Assignee: KAROGEN LLC, Delray Beach, FL (US)

( * ) Notice: Subject to any disclaimer, the term of this patent is extended or adjusted under 35 U.S.C. 154(b) by 0 days.

(21) Appl. No.: 19/381,019

(22) Filed: Nov. 6, 2025

Related U.S. Application Data

(60) Provisional application No. 63/720,820, filed on Nov. 15, 2024.

(51) Int. Cl.
| | |
|---|---|
| *A01G 9/28* | (2018.01) |
| *A01G 9/02* | (2018.01) |
| *A01G 9/029* | (2018.01) |
| *A01G 13/30* | (2025.01) |
| *A01G 13/33* | (2025.01) |
| *A01G 13/38* | (2025.01) |
| *A01G 31/02* | (2006.01) |
| *A01G 31/06* | (2006.01) |
| *E02B 11/00* | (2006.01) |

(52) U.S. Cl.
CPC .............. *A01G 9/28* (2018.02); *A01G 9/029* (2018.02); *A01G 9/027* (2013.01); *A01G 13/30* (2025.01); *A01G 13/33* (2025.01); *A01G 13/38* (2025.01); *A01G 31/02* (2013.01); *A01G 31/06* (2013.01); *E02B 11/005* (2013.01)

(58) Field of Classification Search
CPC .......... A01G 9/28; A01G 9/029; A01G 13/33;

A01G 13/30; A01G 13/32; A01G 9/047; A01G 31/02; A01G 31/06; A01G 9/027; E02B 5/02; E02B 11/005; A01N 25/00
See application file for complete search history.

(56) References Cited

U.S. PATENT DOCUMENTS

| | | | | |
|---|---|---|---|---|
| 3,676,952 | A | * | 7/1972 | Watts ........................ A01G 9/28 |
| | | | | 47/33 |
| 5,048,241 | A | * | 9/1991 | Gavin, Jr. ................ A01G 9/28 |
| | | | | 47/33 |
| 5,274,952 | A | * | 1/1994 | Wood ..................... A01G 9/029 |
| | | | | 47/65.5 |
| 5,996,280 | A | * | 12/1999 | Michailiuk ............ A01G 9/047 |
| | | | | 47/84 |
| 6,986,222 | B1 | * | 1/2006 | Cochran ................ A01G 9/027 |
| | | | | 52/302.1 |
| 7,306,402 | B2 | * | 12/2007 | Graber ..................... E02B 5/02 |
| | | | | 47/33 |

(Continued)

FOREIGN PATENT DOCUMENTS

WO     WO-2019191833 A1 * 10/2019 ............ A01G 31/06

*Primary Examiner* — Omar F Hijaz

(74) *Attorney, Agent, or Firm* — Peter J. Van Bergen

(57) ABSTRACT

A landscaping containment system includes a first wall, a second wall, and weed-blocking material. The first and second walls are anchored to a ground region with the two walls extending vertically upward from the ground region. The first wall and second wall are spaced apart from one another. The weed-blocking material is coupled to the first wall and second wall such that the first wall, second wall, and weed-blocking material lie along a periphery of a U-shaped channel.

9 Claims, 7 Drawing Sheets

(56)                    References Cited

U.S. PATENT DOCUMENTS

| | | | | |
|---|---|---|---|---|
| 8,702,346 | B2 * | 4/2014 | Meert | A01G 9/28 |
| | | | | 405/118 |
| 2003/0204987 | A1 * | 11/2003 | Eicher | A01G 13/30 |
| | | | | 47/32 |
| 2004/0194373 | A1 * | 10/2004 | Fraleigh | A01G 9/28 |
| | | | | 47/58.1 R |
| 2009/0255174 | A1 * | 10/2009 | Begin | A01G 2/00 |
| | | | | 47/58.1 R |
| 2019/0269082 | A1 * | 9/2019 | Klein | A01G 31/06 |

* cited by examiner

LANDSCAPING CONTAINMENT SYSTEM

Pursuant to 35 U.S.C. § 119, the benefit of priority from provisional application 63/720,820, with a filing date of Nov. 15, 2024, is claimed for this non-provisional application.

FIELD OF THE DISCLOSURE

This disclosure relates generally to landscaping accessories, and more particularly to methods and systems for containment of landscaping features, plantings, and/or irrigation elements.

BACKGROUND

Attractive and sustainable landscaping is an integral element of residential and commercial properties. Today, a good landscaping installation enhances aesthetics but also supports the use of environmentally-friendly technologies and products, reduces maintenance, provides for efficient use of irrigation systems, and reduces time and costs associated with annual or seasonal landscape changes.

SUMMARY

Accordingly, it is an object of the present disclosure to describe methods and systems for use in landscaping.

Another object of the present disclosure is to describe methods and system related to containment of landscape features, plantings, and/or irrigation elements.

Other objects and advantages of the methods and systems described herein will become more obvious hereinafter in the specification and drawings.

In accordance with methods and systems described herein, a landscaping containment system includes a first wall, a second wall, and weed-blocking material. The first wall and second wall are adapted to be anchored to a ground region with the first wall and second wall extending vertically upward from the ground region. The first wall and second wall are spaced apart from one another. The weed-blocking material is coupled to the first wall and second wall, wherein the first wall, second wall, and weed-blocking material lie along a periphery of a U-shaped channel.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figures 1, 2:
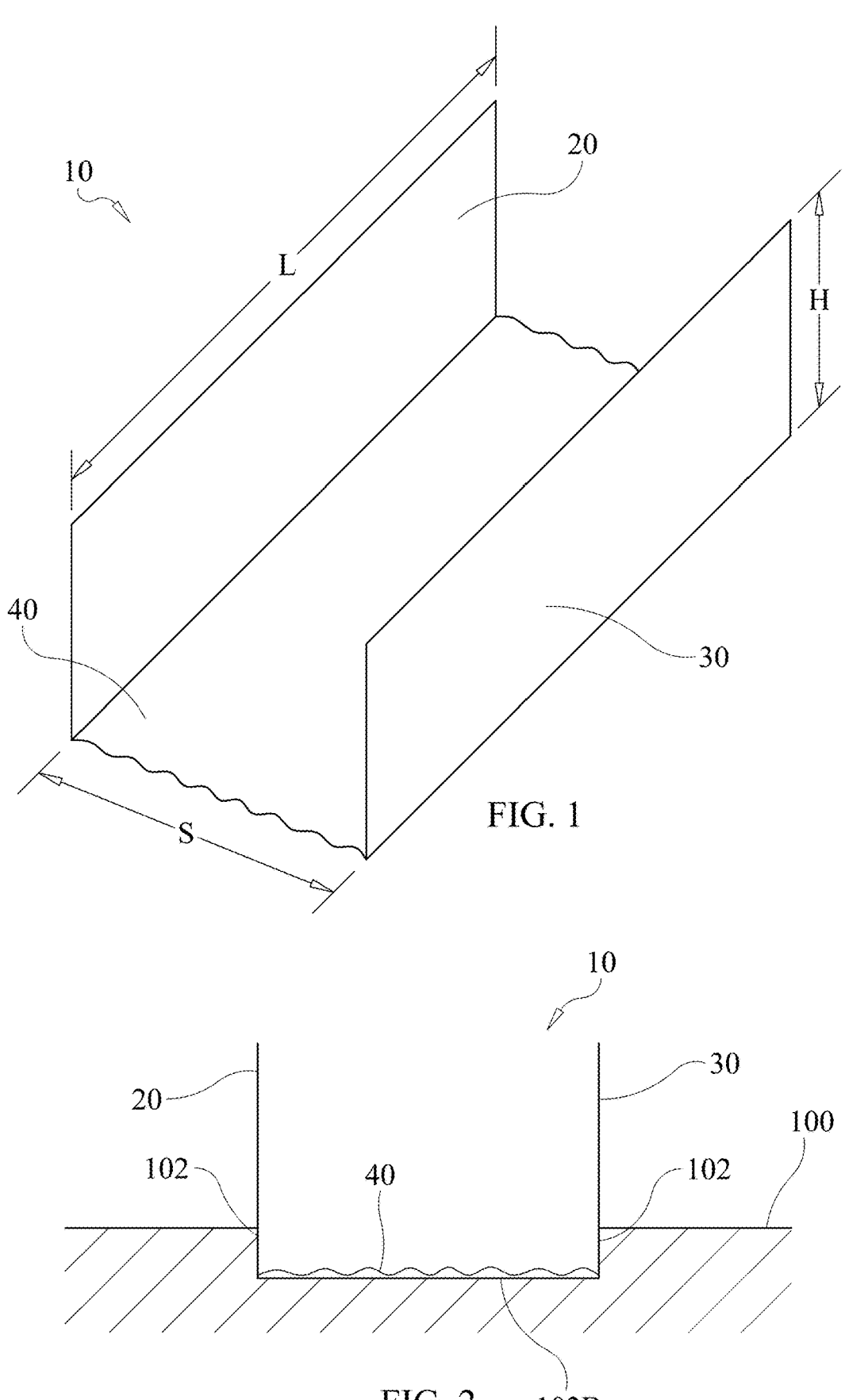
FIG. 1 illustrates a perspective view of one embodiment of a landscape containment system in accordance with various aspects as described herein.
FIG. 2 illustrates an end view of one embodiment of a landscape containment system installed in and extending up from a ground region in accordance with various aspects as described herein.

Referring now to the drawings and more particularly to FIG. 1, a perspective view of a landscaping containment system in accordance with an embodiment of the present disclosure is illustrated and is referenced generally by numeral 10. As will be described further below, landscaping containment system 10 may be placed and anchored to a ground region being landscaped. Landscaping containment system 10 may be used in a variety of ways to include, but not limited to, defining a border of a planting bed, defining an edge of a walkway, bikeway, or roadway, and/or defining a decorative feature in a landscape. Landscaping containment system 10 may be used to hold and contain one or more landscaping elements to include, but not limited to, plants, stone, sand, soil, irrigation lines/elements, and electric lines such as low-voltage power lines, invisible fence wiring, etc.

In the illustrated embodiment, landscaping containment system 10 is a U-shaped channel whose periphery is defined by a first wall 20, a second wall 30, and a weed-blocking material 40. In some embodiments, walls 20 and 30 and weed-blocking material 40 may be made from flexible or semi-flexible materials (e.g., plastic, metal, wood, rubber, composites, etc.) to facilitate their shaping for correspondence with a particular landscape design. In some embodiments, walls 20 and 30 may be made from composite outdoor decking boards. In some embodiments, braces or stabilizers in the form of rods, walls, etc., may be used to periodically span the gap between walls 20 and 30 to maintain the U-shaped channel. Weed-blocking material 40 may be semi-porous or completely non-porous depending on the landscaping elements that are to be placed in system 10. First wall 20 and second wall 30 are spaced apart from one another by a spacing "S" along the lengths of the walls. Spacing S may be fixed or varied along the length of system 10. Spacing S may be predetermined and fixed, or spacing S may be configurable in-situ when flexible or semi-flexible materials are used for the walls and weed-blocking material. The length "L" and height "H" of landscaping containment system 10 may be varied without departing from the scope of the present disclosure. In some embodiments and as will be described later herein, the landscaping containment system of the present disclosure may be provided in various lengths and shapes to present a modular system providing for end-to-end positioning to create a desired shape.

Referring additionally to FIG. 2, landscaping containment system 10 is illustrated anchored to a ground region 100. In the illustrated example, landscaping containment system 10 is partially countersunk in a trench 102 in ground region 100 such that walls 20 and 30 extend vertically upward from ground region 100, while weed-blocking material rests on the base 102B of trench 102. Once in position in ground region 100, the U-shaped channel defined by walls 20 and 30 and weed-blocking material 40 may be partially filled or completely filled with landscape elements (not shown) of choice. For example, an irrigation line (e.g., conduit, drip line, etc.) may be placed in system 10 prior to the placement of, for example, planting materials. In some embodiments, system 10 may be filled with landscaping stones or pavers. In some embodiments, electrical power lines may be positioned in system 10. In some embodiments, sprinkler heads may extend up from an irrigation line and lights may extend up from an electrical power line. One or more combinations of the above-mentioned landscape elements and/or other landscape elements may be included in system 10 without departing from the scope of the present disclosure.

Figures 3, 4:
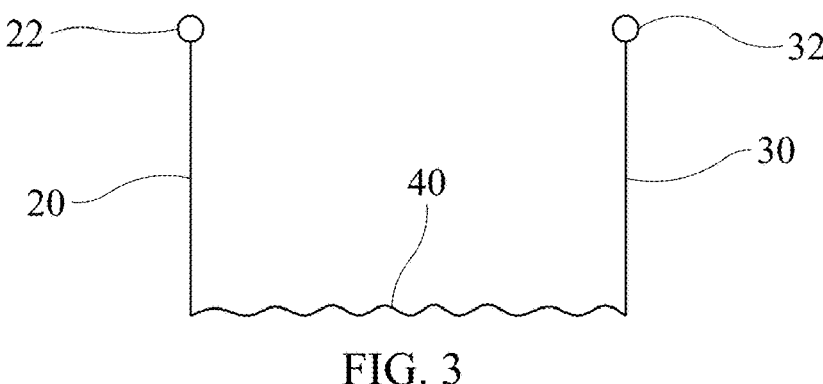
FIG. 3 illustrates an end view of another embodiment of a landscape containment system incorporating longitudinal beads at the top thereof in accordance with various aspects as described herein.
FIG. 4 illustrates a perspective view of another embodiment of a landscape containment system incorporating spikes at the bottom thereof in accordance with various aspects as described herein.

The landscaping containment system of the present disclosure may incorporate additional features to enhance one or more of the system's strength, aesthetics, installation process, and uses. Several non-limiting exemplary embodiments will be described herein with reference to FIGS. 3-6. In FIG. 3, the top edge of each wall 20 and 30 incorporates a bead 22 and 32, respectively, extending along the length of each wall. Beads 22 and 32 present a convex surface and may be partially or completely cylindrical beads that enhance the walls' strength and aesthetics. Furthermore, and as will be described with reference to FIG. 6, the beads may be used for support of easily placed and removed planting containers. Beads 22 and 32 may be attached to or integrated with walls 20 and 30, respectively, in a variety of ways without departing from the scope of the present disclosure.

In FIG. 4, the bottom edge of each wall 20 and 30 incorporates spikes 24 and 34, respectively, spaced-apart along the length of the walls. Spikes 24 and 34 facilitate the anchoring of the landscaping containment system to a ground region. A landscaping containment system of the present disclosure having spikes 24 and 34 may be installed in trench in a ground region (e.g., trench 102 illustrated in FIG. 2). However, in some embodiments, spikes 24 and 34 may provide sufficient anchoring support if simply pressed into engagement with the top of a ground region, i.e., no trench would be required.

Figure 5:
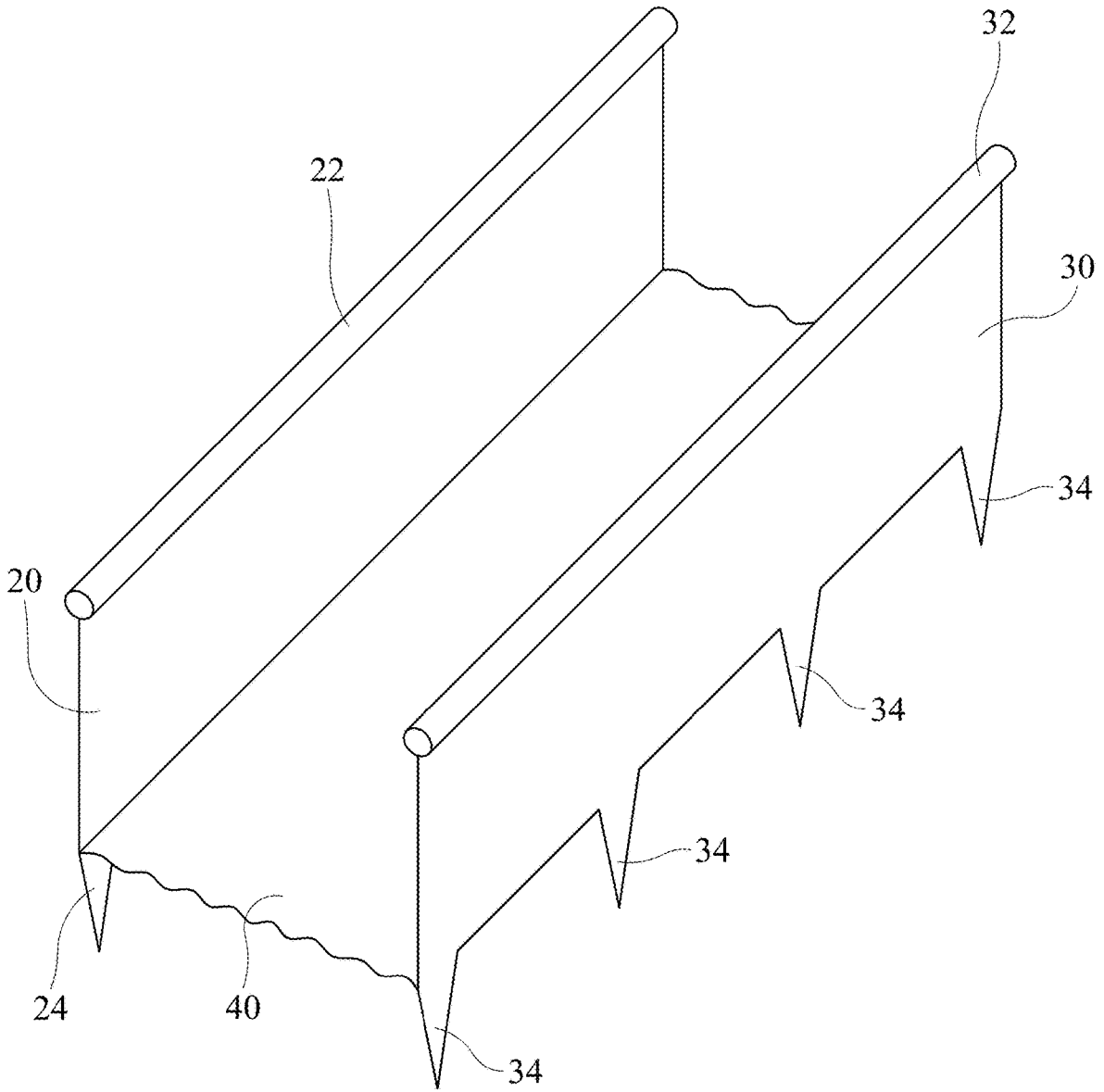
FIG. 5 illustrates a perspective view of another embodiment of a landscape containment system incorporating longitudinal beads at the top thereof and spikes at the bottom thereof in accordance with various aspects as described herein.
Figure 6:
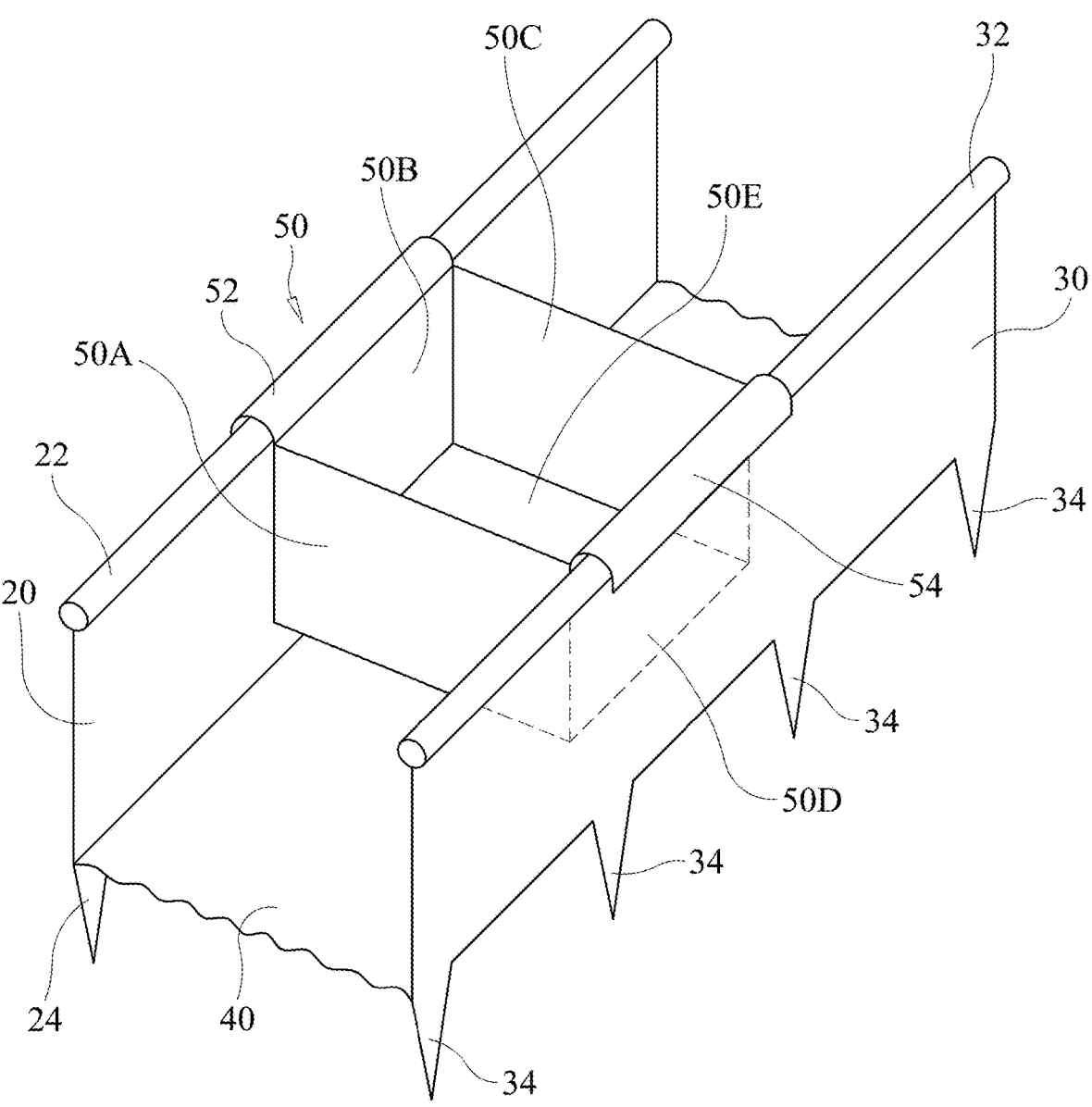
FIG. 6 illustrates a perspective view of another embodiment of a landscape containment system further including open-top landscaping receptacles in accordance with various aspects as described herein.

In FIG. 5, the landscaping containment system includes both the above-described beads 22 and 32 and the above-described spikes 24 and 34. In FIG. 6, a landscaping containment system having the above-described beads 22 and 32 further includes one or more planting receptacles 50.

Each planting receptacle 50 is an open-top receptacle having four walls 50A-50D and a base or bottom 50E. Opposing top regions 52 and 54 of the receptacle define flanges (e.g., concave or C-shaped flanges as illustrated) for cooperative engagement with beads 22 and 32, respectively, thereby supporting planting receptacle 50 in the U-shaped channel defined by walls 20 and 30 and weed-blocking material 40. The depth of receptacles 50 may be designed to provide for the passage of water and/or electrical conduits (not shown) between bottom 50E and weed-blocking material 40.

Figure 7A:
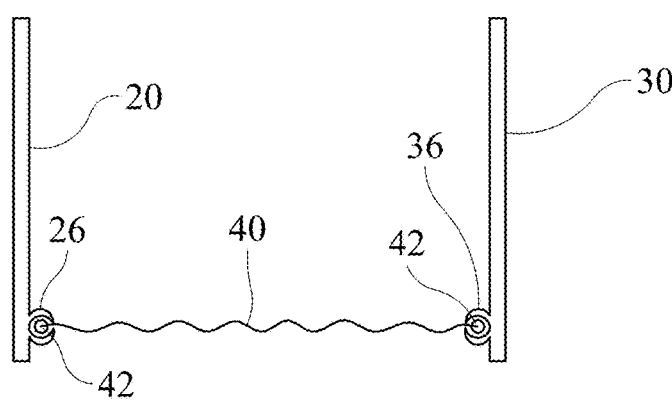
FIG. 7A illustrates an end view of another embodiment of a landscape containment system having C-shaped retention clips incorporated in the side walls thereof for attachment of weed-blocking material in accordance with various aspects as described herein.
Figure 7B:
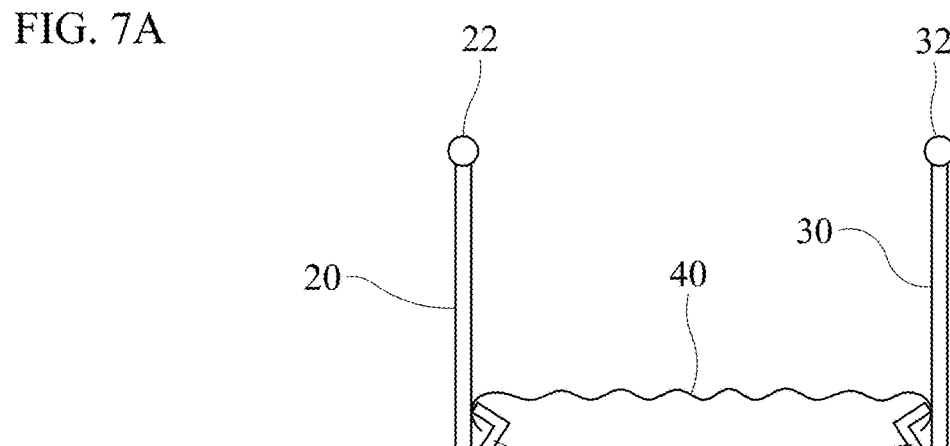
FIG. 7B illustrates an end view of another embodiment of a landscape containment system having spring-biased retention clips incorporated in the side walls thereof for attachment of weed-blocking material in accordance with various aspects as described herein.
Figure 7C:
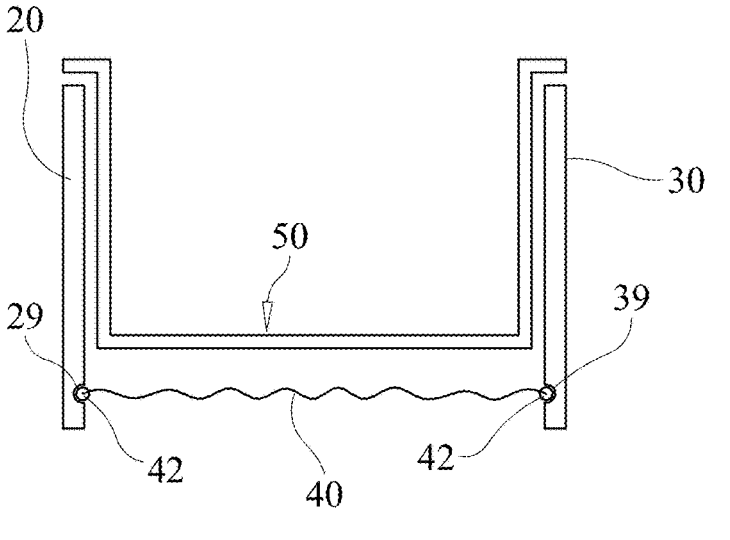
FIG. 7C illustrates an end view of another embodiment of a landscape containment system having grooves incorporated in the side walls thereof that clip onto and retain the weed-blocking material in accordance with various aspects as described herein.

In some embodiments, weed-blocking material 40 may be attached to walls 20 and 30 during a manufacturing process such that the landscaping containment system is a one-piece or unitary structure ready for installation in a ground region. In some embodiments, the above-described walls 20 and 30 may incorporate retention clips to provide for the attachment of weed-blocking material 40. For example and with reference to FIG. 7A, C-shaped retention clips 26 and 36 may be attached to or integrated with (e.g., extending from or into) walls 20 and 30, respectively, along the lengths thereof. Weed-blocking material 40 may be pushed into clips 26 and 36 to hold it in place. In the illustrated embodiment, weed-blocking material 40 may include edge beads 42 designed to snap-fit into clips 26 and 36. In some embodiments and as illustrated in FIG. 7B, spring-biased retention clips 28 and 38 may be attached to or integrated with walls 20 and 30, respectively. In this example, each of clips 28 and 38 is spring-biased towards its respective wall to firmly hold weed-blocking material 40 in place. Beads 22 and 32 may be included as part of walls 20 and 30, respectively, as described previously herein. In some embodiments and as illustrated in FIG. 7C, a retention clip in each of walls 20 and 30 may be defined by grooves 29 and 39, respectively, for retention of weed-blocking material 40 as beads 42 snap into each groove. A receptacle 50 may be engaged with the tops of walls 20 and 30 as described above.

Figure 8A:
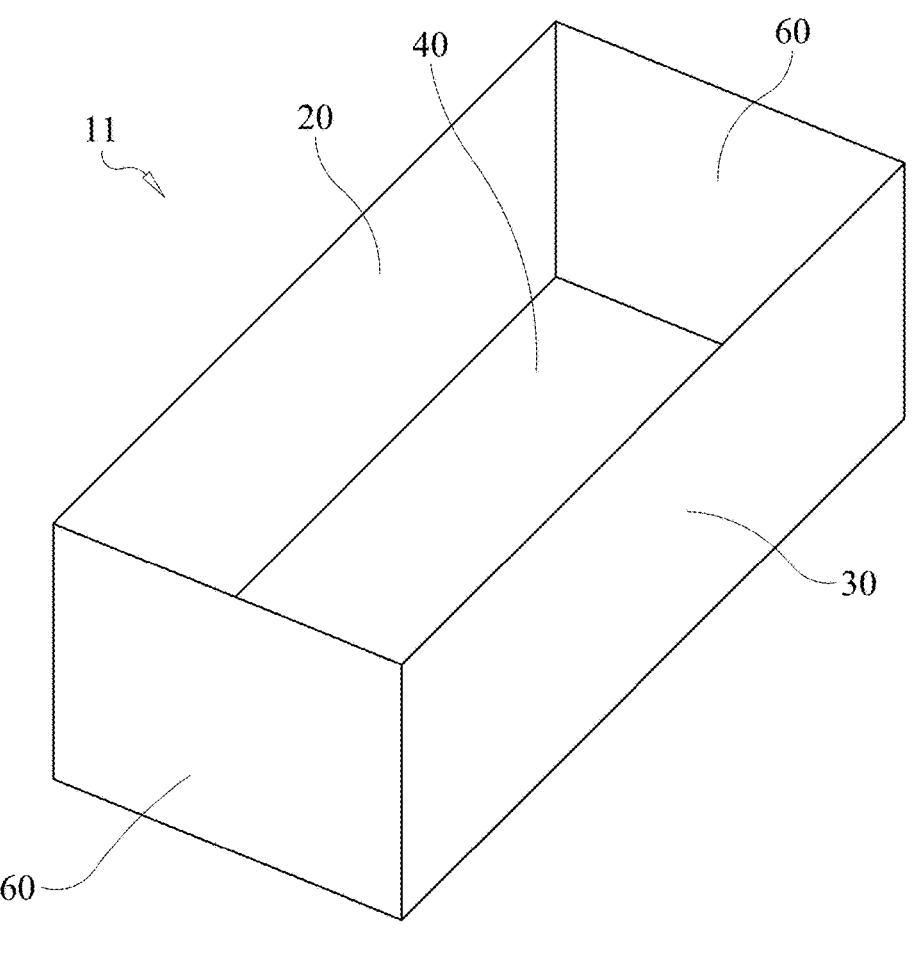
FIG. 8A illustrates a perspective view of another embodiment of a modular landscape containment system having end walls coupled to the side walls in accordance with various aspects as described herein.
Figure 8B:
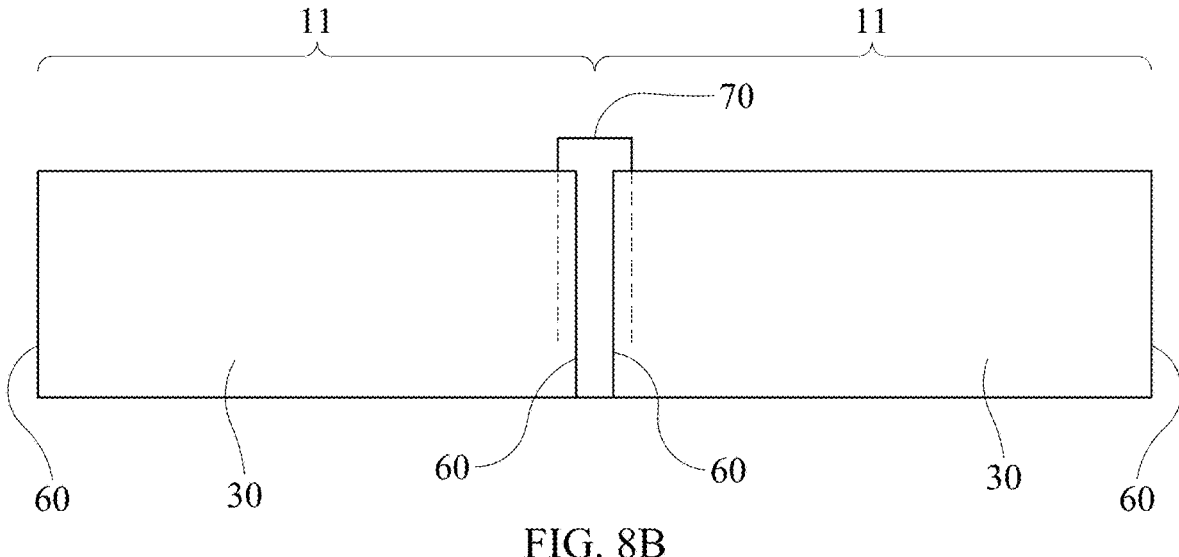
FIG. 8B illustrates a side view of two modular landscape containment systems joined end-to-end with a fastening clip in accordance with various aspects as described herein.
Figure 9:
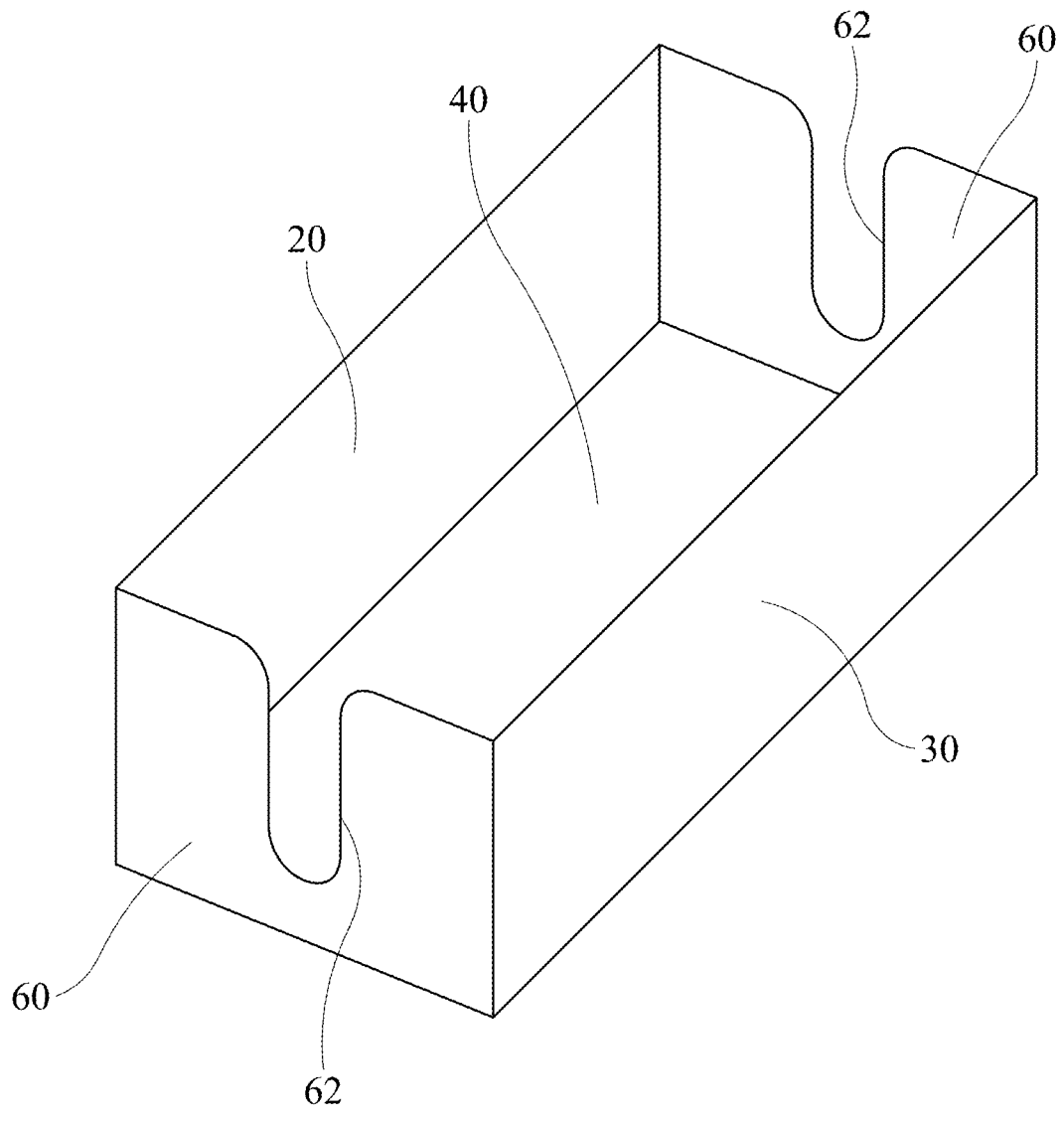
FIG. 9 illustrates a perspective view of another embodiment of a modular landscape containment system having end walls coupled to the side walls with the end walls being slotted to receive water and/or power conduits in accordance with various aspects as described herein.

As mentioned above, the landscaping containment system of the present disclosure may be modular. An exemplary modular construction will now be described with simultaneous reference to FIGS. 8A and 8B where FIG. 8A illustrates a single modular landscaping system 11 and FIG. 8B illustrates two modular systems 11 coupled to one another in an end-to-end fashion. System 11 may include some or all features (e.g., top-edge beads, bottom-edge spikes, and/or retention clips for the weed-blocking material) described previously herein. System 11 further includes end walls 60 spanning between and attached to the longitudinal ends of walls 20 and 30. That is, walls 20, 30 and 60 essentially define an open-ended sleeve. When weed-blocking material 40 is attached at least to walls 20 and 30 as described previously herein, the combination of walls 20, 30 and 60 with weed-blocking material 40 define a container. As shown in FIG. 8B, two such systems 11 may be joined end-to-end using one or more fastening clips that engage two adjacent walls 60 associated with two systems 11. For example and as illustrated, a fastening clip 70 may be passed over two adjacent walls 60. However, the present disclosure is not so limited as a fastening clip may also be passed through two adjacent walls without departing from the scope of the present disclosure. In some embodiments and as illustrated in FIG. 9, walls 60 may be slotted at 62 to facilitate the passage of water and/or electrical conduits (not shown) between adjoined landscaping containment systems. In some of the embodiments described previously herein, "punch out" holes (not shown) may be provided in walls 20, 30, and/or 60 to thereby give the user options for placement of water and/or electrical conduits. In some of the embodiments described previously herein, "punch out" holes (not shown) may also or alternatively be provided in weed-blocking material 40.

The advantages of the methods and systems described herein are numerous. The landscaping containment system is simple to manufacture and install. The system is adaptable for containment of a variety of landscape elements to achieve aesthetic and/or functional goals. The methods and systems described herein may be used by professionals as well as do-it-yourself homeowners.

Although the methods and systems presented herein have been described for specific embodiments thereof, there are numerous variations and modifications that will be readily apparent to those skilled in the art in light of the above teachings. It is therefore to be understood that, within the scope of the appended claims, the methods and systems presented herein may be practiced other than as specifically described.

What is claimed as new and desired to be secured by Letters Patent of the United States is:

1. A landscaping containment system, comprising:
   a first wall;
   a second wall, wherein a bottom edge of each of said first wall and said second wall includes spikes operable to be pressed into a ground region, wherein said first wall and said second wall extend vertically upward from the ground region, and wherein said first wall and said second wall are spaced apart from one another;
   a first retention clip integrated with and extending along said first wall;
   a second retention clip integrated with and extending along said second wall; and
   a single piece of weed-blocking material, wherein said first retention clip is operable to couple said weed-blocking material to said first wall, wherein said second retention clip is operable to couple said weed-blocking material to said second wall, and wherein said first wall, said second wall, and said weed-blocking material lie along a periphery of a U-shaped channel facing upward with respect to the ground region.

2. The landscaping containment system of claim 1, wherein a top edge of each of said first wall and said second wall comprises a longitudinal bead.

3. The landscaping containment system of claim 1, wherein said first wall, said second wall, and said weed-blocking material comprise flexible materials.

4. The landscaping containment system of claim 1, wherein said first wall and said second wall comprise composite materials.

5. The landscaping containment system of claim 2, further comprising an open-top receptacle having flanges at each of opposing top regions of said receptacle, each of said flanges operable to engage said longitudinal bead of one of said first wall and said second wall, wherein said receptacle resides in said U-shaped channel.

6. A landscaping containment system, comprising:
   two opposing and spaced-apart walls, each of said two walls having a first edge and a second edge, said second edge including spikes, said spikes operable to be pressed into a ground region, wherein said first edge associated with each of said walls extends horizontally above the ground region;
   a single piece of weed-blocking material; and
   retention clips integrated with each of said two walls, said retention clips operable to attach said weed-blocking material to said walls, wherein said weed-blocking material spans a gap between said two walls, and wherein said walls and said weed-blocking material are a U-shaped channel facing upward from the ground region.

7. A landscaping containment system, comprising:
   two opposing and spaced-apart walls, each of said two walls having a first edge and a second edge, said second edge including spikes, said spikes operable to be pressed into a ground region, wherein said first edge associated with each of said walls extends horizontally above the ground region;
   a weed-blocking material;
   retention clips integrated with each of said two walls, said retention clips operable to attach said weed-blocking material to said walls, wherein said walls and said weed-blocking material are a U-shaped channel; and
   an open-top receptacle having flanges at opposing top regions of said receptacle, each of said flanges operable to engage said first edge of one of said walls, wherein said receptacle resides in said U-shaped channel.

8. The landscaping containment system of claim 7, wherein said walls and said weed-blocking material comprise flexible materials.

9. The landscaping containment system of claim 7, wherein said walls comprise composite materials.

* * * * *